United States Patent [19]
Elmis et al.

[11] Patent Number: 4,578,705
[45] Date of Patent: Mar. 25, 1986

[54] DIGITAL CIRCUIT FOR SYNCHRONIZING A PULSE TRAIN

[75] Inventors: Herbert Elmis, Denzlingen; Reiner Backes, Freiburg, both of Fed. Rep. of Germany

[73] Assignee: ITT Industries, Inc., New York, N.Y.

[21] Appl. No.: 592,920

[22] Filed: Mar. 23, 1984

[30] Foreign Application Priority Data

Mar. 26, 1983 [EP] European Pat. Off. ........ 83710013.0
Aug. 9, 1983 [EP] European Pat. Off. ........ 83201165.4

[51] Int. Cl.[4] .................. H04N 5/04; H04N 5/12; H03L 7/00
[52] U.S. Cl. .................... 358/148; 358/17; 358/150; 328/63; 328/133; 328/139; 328/179; 324/83 R; 324/83 D; 307/269
[58] Field of Search ............... 358/17, 148, 149, 150, 358/158; 328/63, 132, 139, 179, 133; 324/83 R, 83 D; 307/269

[56] References Cited

U.S. PATENT DOCUMENTS 4,454,531 6/1984 Elmis et al. ................ 358/17
4,471,299 9/1984 Elmis ......................... 324/83 D
4,489,342 12/1984 Collinger et al. ........... 358/17

Primary Examiner—Tommy P. Chin
Assistant Examiner—Michael D. Parker
Attorney, Agent, or Firm—Donald J. Lenkszus

[57] ABSTRACT

A digital synchronization operation circuit synchronizes a pulse train with horizontal synchronizing pulses contained in a received standard television signal which, after being demodulated in the television receiver, is present as the composite color signal and which is fed to an analog-to-digital converter clocked by a clock signal. The digital synchronization separation circuit has an improved phase resolution such that the phase resolution is greater than the resolution provided by the pulse width of clocking signals.

16 Claims, 6 Drawing Figures

DIGITAL CIRCUIT FOR SYNCHRONIZING A PULSE TRAIN

BACKGROUND OF THE INVENTION

The present invention relates to a digital circuit for synchronizing a pulse train.

A digital circuit of this kind is disclosed in the published European Patent Application EP No. 43 407 A2.*) It serves to synchronize a pulse train obtained as the output signal of the presettable frequency divider for a clock signal whose frequency is at least one order of magnitude higher than that of the pulse train. The pulse train is synchronized with horizontal synchronizing pulses contained in a received standard television signal which, after being demodulated in the television receiver, is present as the composite color signal and which is fed to an analog-to-digital converter clocked by a clock signal. The divisor of the frequency divider is set depending on the phase difference between the pulse train and the horizontal synchronizing pulses which is averaged over an averaging time equal to a major number of periods of the horizontal synchronizing pulses.

*)corresponding to U.S. Ser. No. 276,573 filed June 23, 1981, abandoned and U.S. Ser. No. 509,979 filed June 30, 1983, now U.S. Pat. No. 4,471,299.

In the arrangement of the above identified application, the resolution of the digital phase measurement is determined by the frequency of the clock signal and can be increased by the averaging, which can be implemented with a digital filter, only for a limited period of time. However, phase errors whose rate of change lies above the cutoff frequency of the filter can only be measured with the accuracy of one clock-signal period. During the horizontal synchronization of television receivers with digital signal-processing circuitry, where the clock frequency is usually four times the frequency of the chrominance subcarrier and where such a clock signal is used as in the present invention and in the above identified application, it is necessary to have a higher phase resolution than that given by the period of the clock signal.

SUMMARY OF THE INVENTION

It is an object of the present invention to provide an improved digital circuit for achieving synchronization, particularly horizontal synchronization in color-television receivers with digital signal-processing circuitry, whose phase resolution is considerably better than that in the known prior art, and selectable.

DESCRIPTION OF THE DRAWINGS

The invention will now be explained in more detail with reference to the accompanying drawings, in which.

DETAILED DESCRIPTION

Figure 1:
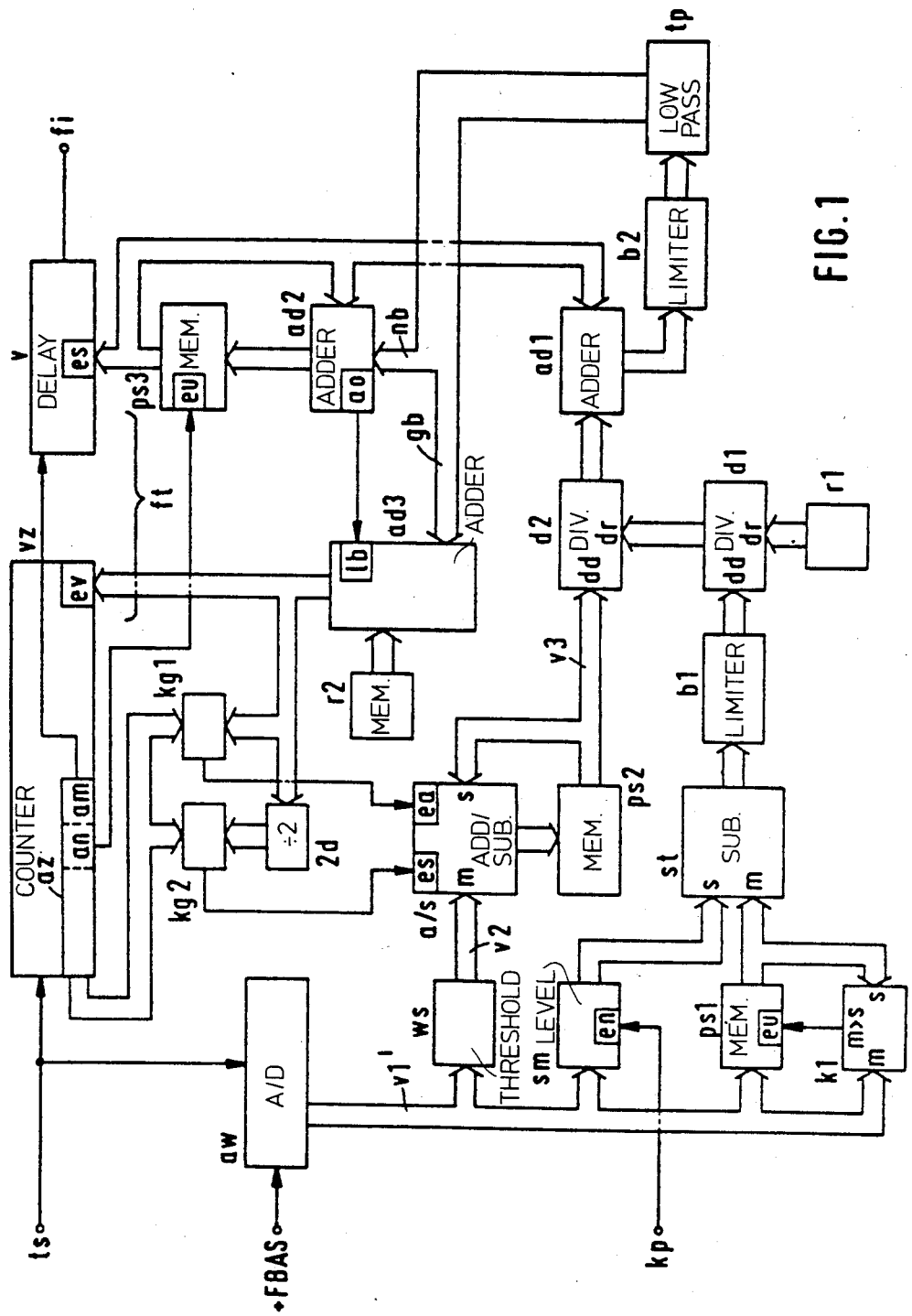
FIG. 1 is a block diagram illustrating the underlying principle of the invention with the aid of an embodiment in which positive composite color signals are processed.

FIG. 1 shows a block diagram of an embodiment of the invention in which a positive composite color signal is processed. The composite color signal is applied to the analog input of the analog-to-digital converter aw. The A/D converter aw is clocked by the clock signal ts, and its output is fed to the input of the threshold stage ws, whose threshold value is equal to the desired black level sw. This desired value may be stored as a digital word in a register or a memory operatively connected with the threshold stage ws. For the sake of simplicity, however, such a memory is not shown in FIG. 1.

The output of the analog-to-digital converter aw is also connected to the input of the black-level-measuring stage sm, whose enable input en is presented with a pulse, namely the keying pulse kp, in each line during the burst, to the minuend input of the first comparator k1, and to the input of the first buffer memory ps1, whose output is connected to the subtrahend input s of the first comparator. The minuend-greater-than-subtrahend output m>s is connected to the enable input eu of the first buffer memory ps1. Thus, the function of the two stages k1, ps1 is to determine the maximum of the output signal of the analog-to-digital converter aw.

The output of the black-level-measuring stage sm is connected to the subtrahend input s of the subtracter st, and the output of the first buffer memory ps1 is connected to the minuend input m of this subtracter, whose output is fed through the first limiter b1 to the dividend input dd of the first divider d1. The first limiter b1 limits the amplitude of its output signal to a positive numerical value near zero. The subtracter st thus senses the amplitude of the horizontal synchronizing pulses, which is limited to a finite value by means of the first limiter b1, so that the first divider d1 can provide a meaningful result.

The output of the threshold stage ws is connected to the augend/minuend input m of the adder-subtracter a/s, whose output is fed to the input of the second buffer memory ps2, which has its output connected to the addend/subtrahend input s of the adder-subtracter a/s and to the dividend input dd of the second divider d2. The output of the latter is connected to the first input of the first adder ad1, whose output is fed through the second limiter b2 to the input of the digital low-pass filter tp, which performs the aforementioned averaging function. The second limiter b2 limits the amplitude of its output signal to the numerical value of the phase error necessary for a predetermined capture range of the synchronization.

The following explanation first assumes that the output of the low-pass filter tp is an m-digit that the output, where m is assumed to be an arbitrary integer for the time being. Of this m-digit output, p low-order terminals nb are connected to the first input of the second adder ad2, whose output is fed to the input of the third buffer memory ps3. The output of the third buffer memory ps3 is connected to the second inputs of the first adder ad1 and the second adder ad2 and to the set input es of the digitally settable delay line v, which consists of $2^P$ stages giving the same delay tv and whose setting-step size is equal to this delay tv and to the clock-signal period t divided by $2^P$. The signal input of the delay line v is connected to the maximum-count output am of the presettable counter vz, to whose count input the clock signal ts is applied. The ouput of the delay line v provides the synchronized pulse train fi.

The overflow output ao of the second adder ad2 is connected to the least significant terminal 1b of the first input of the third adder ad3, which has its second input connected to the remaining m-p terminals gb of the low-pass-filter output. The third input of the third adder ad3 is fed with the integral part of the desired value of the divisor, and its output is connected to the preset input ev of the presettable counter vz. The desired value of the divisor may be stored in a register or memory r2, which is operatively connected to the third adder ad3.

The enable input eu of the third buffer memory ps3 is connected to one of the outputs an of the presettable counter vz, which lie before the maximum-count output am.

The functions of subcircuits vz, v, ps3, ad2, ad3 will be briefly explained here. Via the preset input ev, the presettable counter vz can be set to count integers. The setting is determined essentially by the desired value of the divisor and the m-p digits gb of the output signal of the low-pass filter tp. The p low-order digits nb of this output signal influence the digitally settable delay line v in such a way that frequency division by a fraction is obtained. As is well known, fractions can be written mathematically in different ways, namely as a number with a point, as a proper fraction or as an improper fraction:

$$a+0.b=a+d/e=g/e$$

where the left-hand term corresponds to the well known decimal point representation (e.g., 1.2) the middle term is the mixed representation consisting of an integer and a proper fraction (e.g., 1 1/5), and the right-hand term is the representation as an improper fraction (e.g., 6/5).

In each cycle of the presettable counter vz, at the enabling instant, the signal present at the output of the second adder ad2 is transferred into the third buffer memory ps3 and simultaneously applied to the second input of the second adder ad2. Thus the signal applied at the first input of the second adder ad2, which corresponds to the fractional digits behind the point, is added to the divisor, and at the output of the third buffer memory ps3 and, hence, at the set input es of the delay line v, the result is incremented by the divisor with the fractional digits added thereto. The delay vt thus increases by the same amount in each count cycle. When the second adder ad2 reaches its maximum capacity, its overflow output ao provides an overflow signal which is applied to the least significant terminal 1b of the first input of the first adder ad3, where it causes the result to be increased by one unit.

Since the output of this adder is connected to the set input es of the presettable counter vz, the setting word, determined by the integral part of the divisor, is increased by one unit, and the presettable counter vz performs one cycle which is one period t longer than the other count cycles. Since, on the other hand, as soon as the aforementioned overflow signal appears at the overflow output ao of the second adder ad2, the latter returns to the condition in which only the low-order digits nb are summed, the overflow signal disappears, the presettable counter vz performs its shorter cycles again, and the delay line v begins to delay again with the normal setting determined by the fractional digits and with any remainder of the previous addition.

The output of the third adder ad3 is connected to the first input of the first coincidence gate kg1 and, through the divide-by-two divider 2d, to the first input of the second coincidence gate kg2. Connected to the second inputs of the coincidence gates are the outputs of the presettable counter vz. The outputs of the coincidence gates are coupled to the add enable input ae and the subtract enable input es, respectively, of the adder-subtracter a/s. The numerical value 2p is fed to the divisor input dr of the first divider d1. It may be stored in the register or memory r1.

Figure 2:
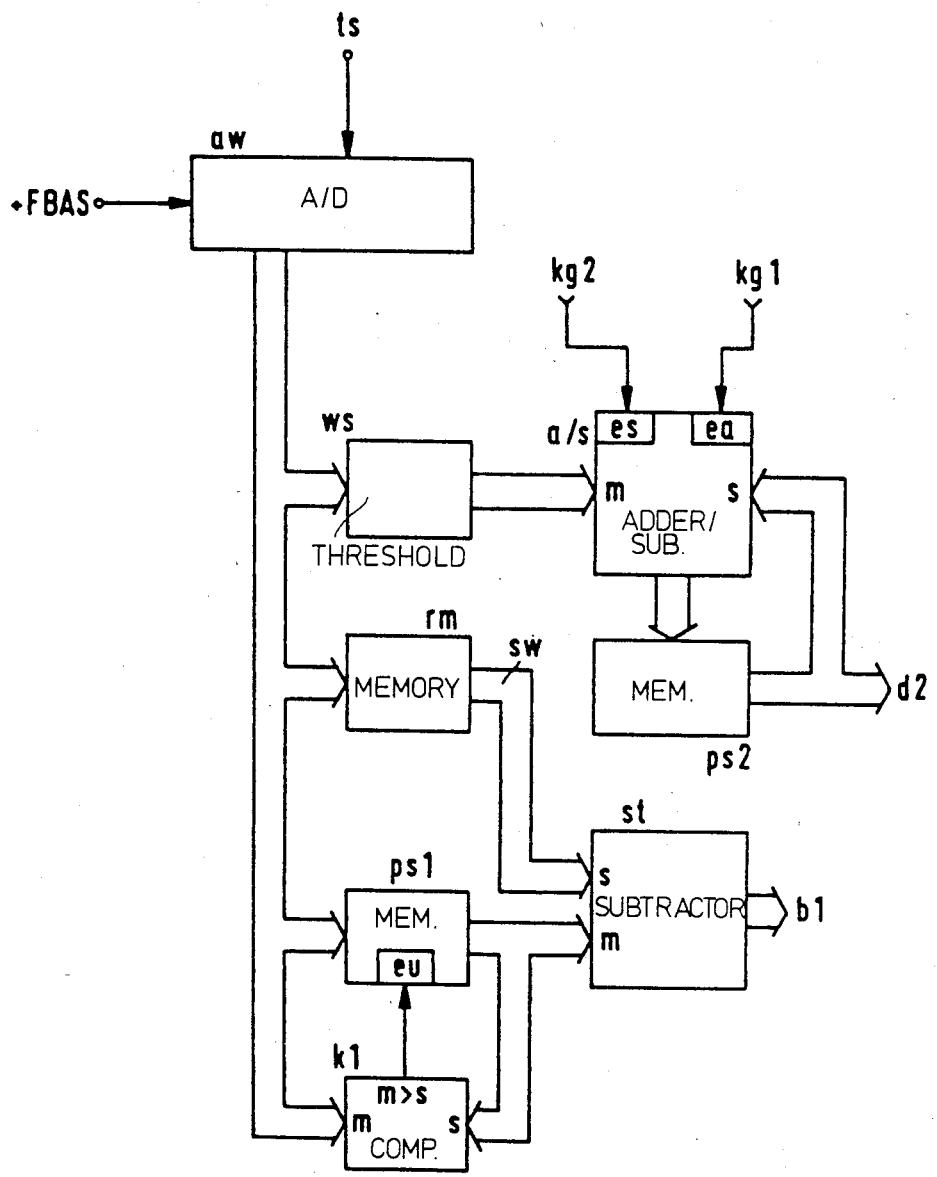
FIG. 2 shows a variant of the arrangement of FIG. 1.

FIG. 2 shows a variant of part of the embodiment of FIG. 1. The black-level-measuring stage sm of FIG. 1 has been replaced by the reprogrammable nonvolatile memory rm, in which the desired black level sw is stored. It should be noted that as shown parenthetically in FIGS. 3, 4 and 5 the black-level-measuring stage sm can be replaced with a reprogrammable memory rm as shown in FIG. 2.

Figure 3:
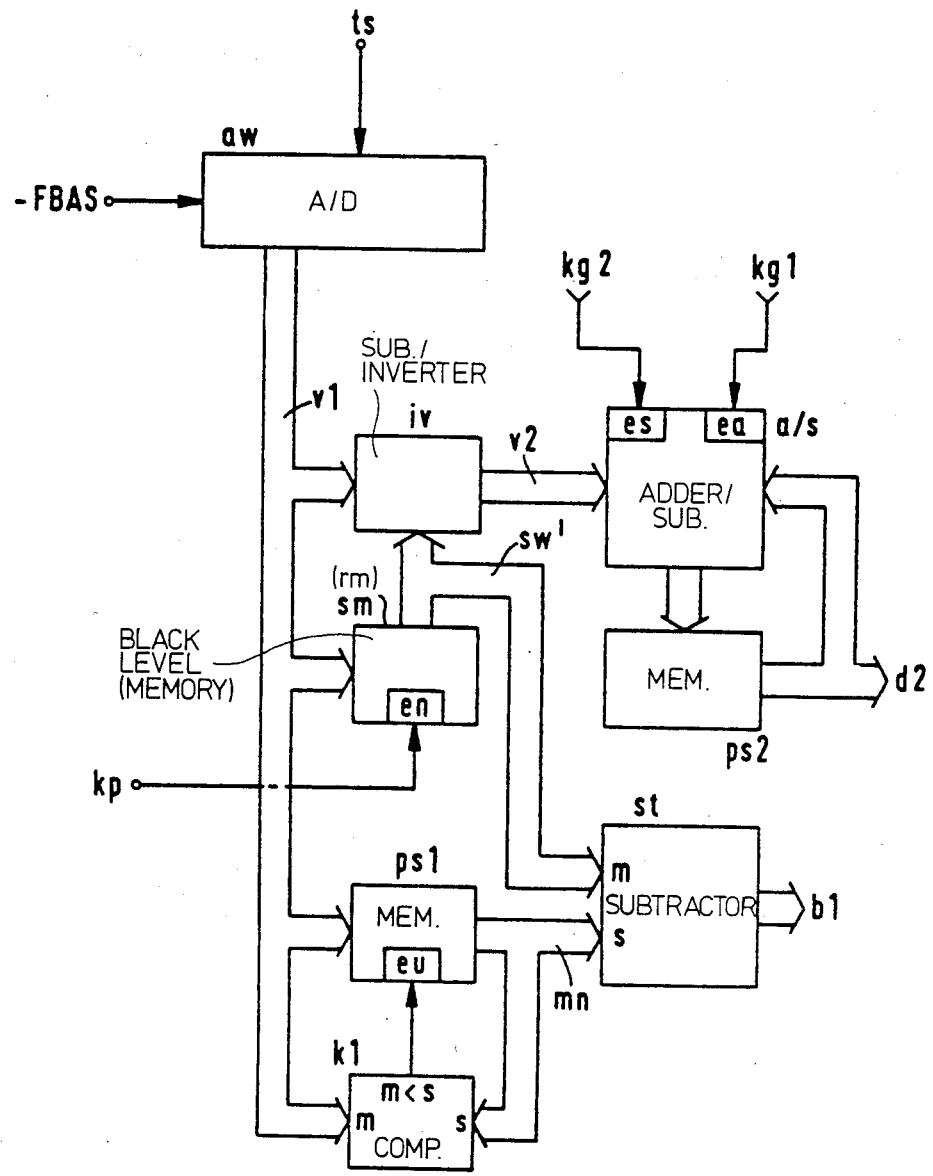
FIG. 3 shows the essential parts of the arrangement of FIG. 1 which have to be modified if negative composite color signals are to be processed.

FIG. 3 shows a part of the arrangement of FIG. 1 including those subcircuits which have to be changed if a negative composite color signal is to be processed. The threshold stage ws of FIG. 1 has been replaced by the subtracter-inverter stage iv, so that the first and second inputs of the latter are connected to the output of the analog-to-digital converter aw and to the output of the black-level-measuring stage sm, respectively. The subtracter-inverter stage iv forms the signal v2, which is free of the horizontal synchronizing signal, from the digital composite color signal v1 and the digital black-level signal sw' according to the following formula:

$$v2 = \tfrac{1}{2}( \sqrt{(sw' - v1)^2} + sw' - v1).$$

Furthermore, in the modification of FIG. 3, the wiring of the inputs of the subtracter st of FIG. 1 has been interchanged, so that the output of the black-level-measuring stage sm is connected to the minuend input m of the subtracter, and the output of the first buffer memory ps1 to the subtrahend input s. The enable input eu of the first buffer memory ps1 is controlled not by the minuend-greater-than-subtrahend output but by the minuend-smaller-than-subtrahend output m<s of the first comparator k1. Thus the stages ps1, k1 detect the minimum mn of the digital composite color signal, not the maximum as in FIG. 1, so that the following subtracter st senses the amplitude of the synchronizing pulses.

Figure 4:
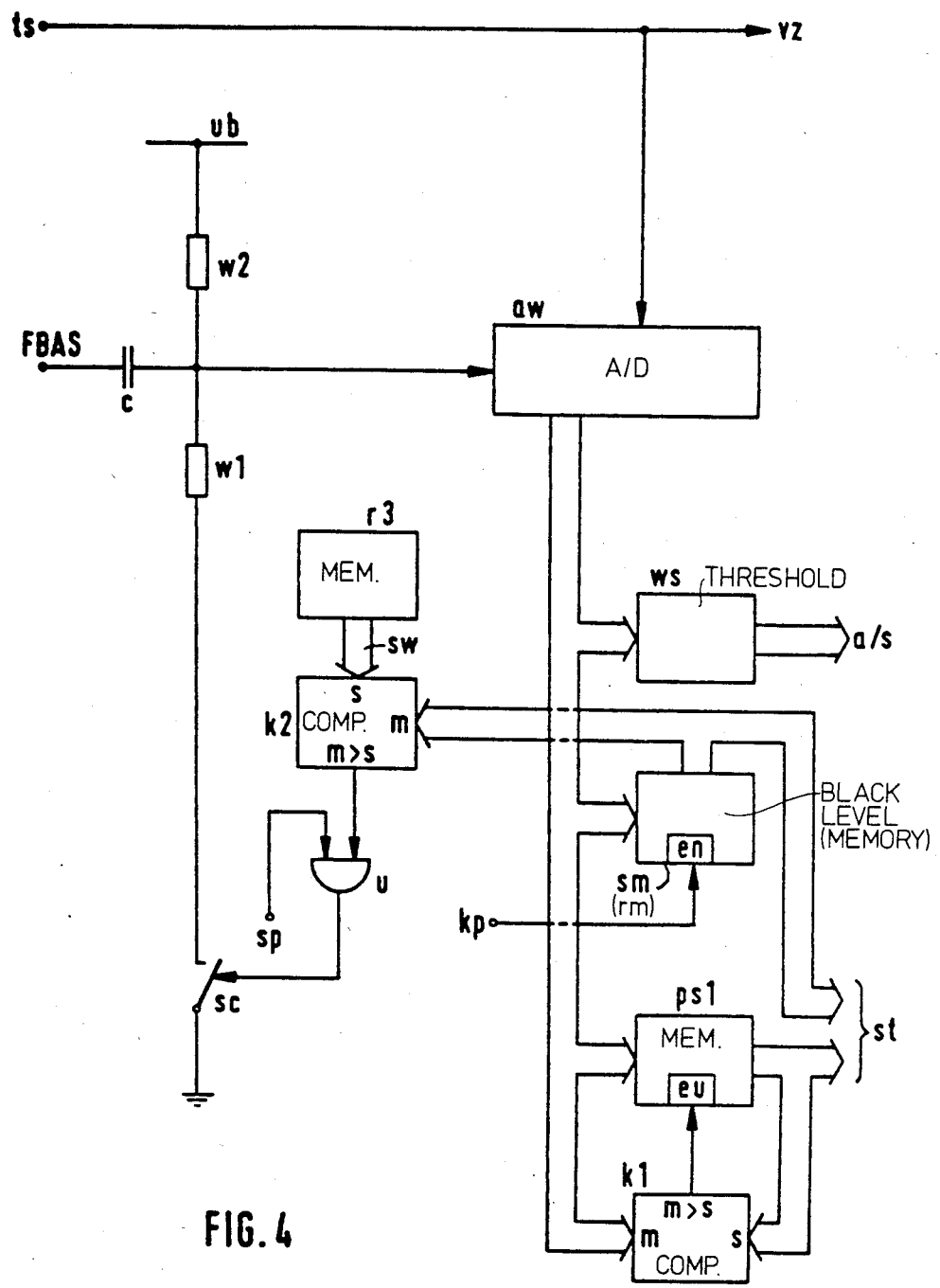
FIG. 4 shows an embodiment of the input wiring of the digital circuit according to the invention.

FIG. 4 shows a preferred embodiment of the invention which can be used both with the arrangement of FIG. 1 and with that of FIG. 3. It shows the use with the arrangement of FIG. 1, of which only a part is illustrated again.

In FIG. 4, the output of the black-level-measuring stage sm is connected to the minuend input of the second comparator k2, to whose subtrahend input is applied the desired black-level value sw, which may be stored in the register or memory r3. The minuend-greater-than-subtrahend output m>s is connected to the first input of the AND gate u, to whose second input a pulse sp, which occurs during the back porch, is applied in each line. The output of the AND gate u is connected to the control input of the electronic switch sc, which has one terminal grounded and the other connected through the first resistor w1 to the input of the analogto-digital converter aw. This input is also connected through the second resistor w2 to the d.c. supply voltage source ub, while the composite color signal is applied to this input through the capacitor c. After the television receiver has been turned on, i.e., when the switch sc is closed, the parts added in FIG. 4 to the arrangement of FIG. 1 permit horizontal-frequency current pulses to be applied through the first resistor w1 to the input of the analog-to-digital converter aw, thereby adjusting the latter to a constant voltage level.

Figure 5:
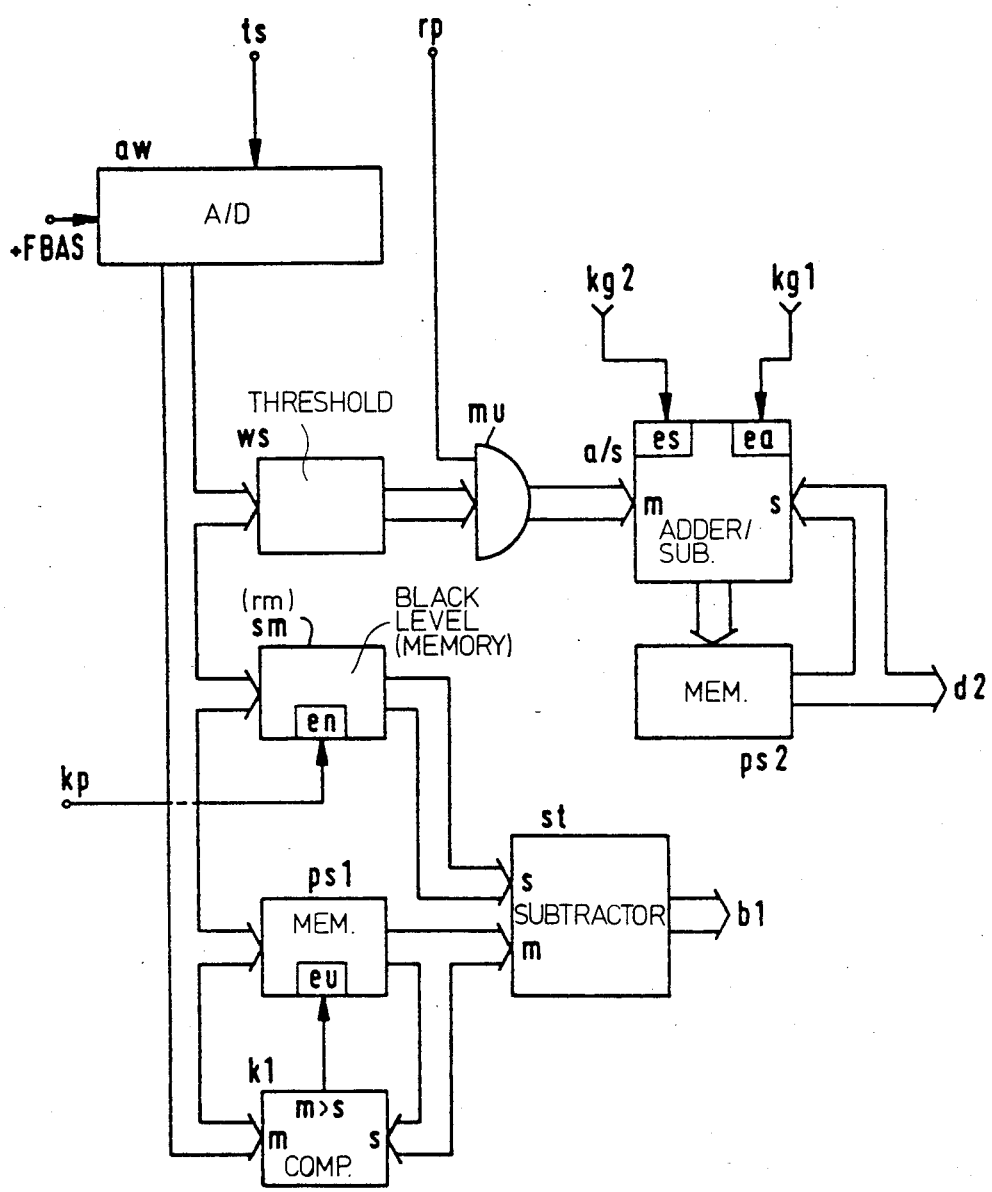
FIG. 5 shows another preferred embodiment.

FIG. 5 shows another preferred embodiment of the invention in which the multi-input AND gate mu, whose number of input lines exceeds the number of output lines of the threshold stage ws by one, is inserted between the output of the threshold stage ws or that of the subtracter-inverter stage iv and the input of the adder/subtracter a/s. This additional input is fed with the noise suppression pulse rp, which occurs during the synchronizing pulses and overlaps the latter symmetrically by $\pm 1$, $\mu$s.

Figure 6:
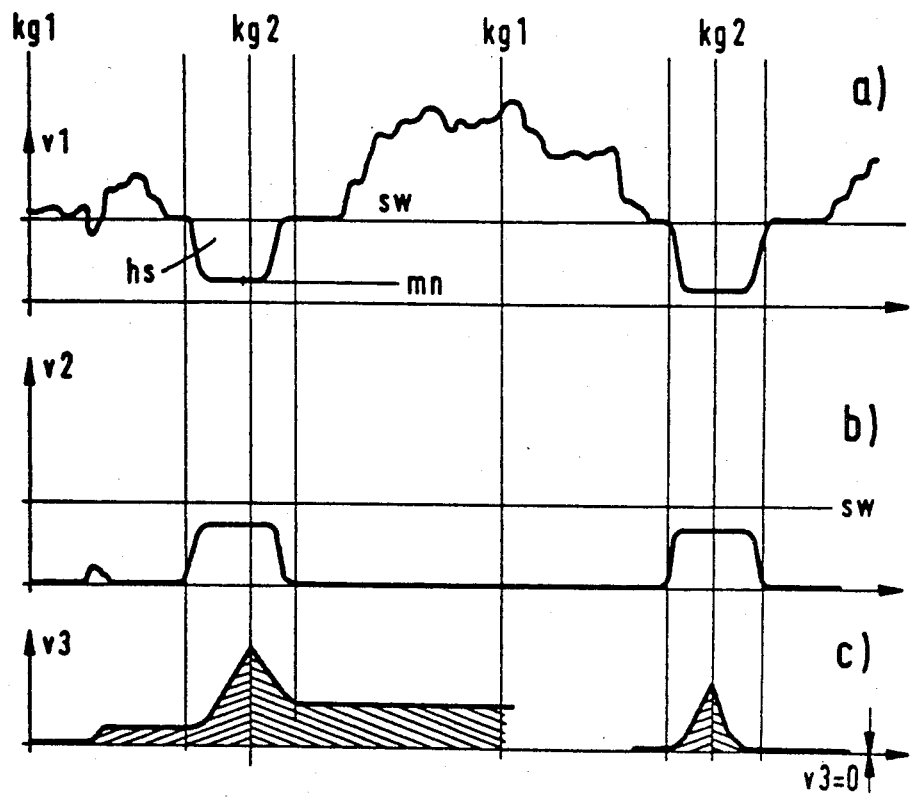
FIG. 6 is a timing diagram illustrating the operation of the circuit.

For the following description of the operation of the circuit, reference is made to FIG. 3 in conjunction with FIG. 1 and to FIG. 6, which shows three curves to illustrate the operation of the circuit. Although the signals v1, v2 and v3, are digital signals, they are shown in analog representation. FIG. 6a shows the signal v1 at the output of the analog-to-digital converter aw, i.e., the composite color signal. In FIG. 6a, this signal is negative, i.e., unlike in a positive color signal, the horizontal and vertical synchronizing pulses are the signal components having the smallest positive amplitude mn.

The vertical reference lines designated kg1 and kg2 mark the leading or trailing edges of the output signals of the coincidence gates kg1 and kg2, respectively, the positions of these edges representing the reference time for the phase measurement in accordance with the invention. Between the edges kg1 and kg2, the adder-subtracter a/s is placed in the add mode, so that it, together with the second buffer memory ps2, acts as a "positive" accumulator and, thus, performs a positive integration of the output signal v2 of the threshold stage ws. Between the edges kg2 and kg1, however, the adder-subtracter a/s works as a subtracter, so that it, together with the buffer memory ps2, acts as a "negative" accumulator and subtracts from the values summed between the edges kg1 and kg2, as is illustrated by the triangular curve in FIG. 6c.

In the synchronized condition, the edge kg2 lies exactly in the middle of the horizontal synchronizing pulse hs, as is known from the above-mentioned arrangement disclosed in the published application EP No. 43 407 A2. This case corresponds to the portions of the curves shown at the right in FIG. 6, where in FIG. 6c, the triangular curve has the same components to the left and the right of the line kg2, so that the integral over the horizontal synchronizing pulse hs, which lies between the two lines running to the left and the right of the lines kg2, is equal to zero. In FIG. 6a and 6b, the desired black level is designated sw.

The signal v3 at the output of the adder-subtracter a/s, while representing an amplitude value, is thus a measure of the phase difference between the horizontal synchronizing pulses and the clock signal ts. In the subsequent circuit, it is converted into a quantity which actually represents a phase difference. To this end, the actual amplitude mn of the horizontal synchronizing pulses is measured by means of the subtracter st and the first limiter b1. By means of the first divider d1, this synchronizing-pulse amplitude mn is referred to the desired resolution of the phase measurement, which, in accordance with the object of the invention, is to be greater than the period of the clock signal ts. The numerical value fed to the divisor input dr of the first divider d1 is equal to the number of stages of the digital delay line v, whose operation and cooperation with the presettable counter vz and the other subcircuits associated with these two circuit components was explained above. In brief, the delay line v has $2^P$ stages giving the same delay; accordingly, the numerical value fed to the divisor input dr of the first divider d1 must be chosen to be equal to $2^P$, too. This numerical value may be stored in a register or memory r1.

The output signal of the first divider d1, which is applied to the divisor input dr of the second divider d2, thus represents the horizontal-synchronizing-pulse amplitude referred to the number of stages of the digital delay line v. Since the averaged integral of the horizontal synchronizing pulses is applied as the signal v3 to the dividend input dd of the second divider d2, the output of the latter represents, to a good approximation, the phase difference between clock and horizontal synchronizing pulses, to be more exact, the time distance between the middle of the synchronizing pulse and a clock pulse.

If no phase difference exists between these two pulses, the signal v3 is zero as mentioned above and as shown in FIG. 6c on the right. If the two pulses differ in phase, a signal v3 different from zero is obtained, as shown in FIG. 6c on the left. In FIGS. 6a and 6b, therefore, the edge kg2 does not lie in the middle of the synchronizing pulse, and a small portion of the video information even lies below the black level sw to which the threshold stage ws limits its output.

As mentioned above, the output of the second divider d2 provides a signal which indicates the phase difference between the clock signal ts and the horizontal synchronizing pulses to a good approximation. This signal is related to the number of stages of the digital delay line v, and the subsequent stages now "correct" it by also referring it to the output signal of the low-pass filter. Although the edges kg1 and kg2 are derived from the presettable counter vz and, thus, only from integral parts of the clock signal ts, it is possible to take into account the resolution determined by the number of stages of the digital delay line v. This is achieved by the first adder ad1, which accumulates the p digits nb of the output signal of the digital low-pass filter tp together with the third buffer memory ps3. These values are added to the output signal of the second divider d2, whereby the desired resolution is reached. This is possible because the arrangement operates linearly, so that this addition does not produce a false result. By this measure, with reference to the synchronizing pulses, the setting resulting from the instant at which the adder-subtracter a/s is switched from add to subtract is corrected with regard to the set number of stages of the digital delay line v. The measured phase error is thus accurate to within the delay tv provided by a stage of the delay line v.

By the measure just described, the use of an additional digital delay line v to control the coincidence gates kg1 and kg2 can be avoided. Special circuits for implementing such digital delay lines are disclosed in the published European Application EP No. 59 802 A1*) or described in applicants' European Application No. 83 10 3820.3, which was not yet published at the filing date of the present application and claims the priority of the as yet unpublished European Application No. 83 10 1491.5.

*)corresponding to U.S. Ser. No. 349,228 filed Feb. 16, 1982 now in U.S. Pat. No. 4,489,342.

What is claimed is:

1. A digital circuit for generating a pulse train and synchronizing said pulse train with horizontal synchronizing pulses contained in a demodulated composite color signal, comprising:
   a source of clock signals having a frequency at least one order of magnitude higher than the frequency of said pulse train;
   a presettable counter, having a preset input, a count input coupled to said source of clock signals, a predetermined count output, and a count output for a count occurring before said predetermined count output;
   an analog-to-digital converter clocked by said clock signals for converting said demodulated composite color signal to digital signals;
   a threshold stage coupled to the output of said analog-to-digital converter and having a threshold value equal to a predetermined black level;
   a black level measuring stage coupled to the output of said analog-to-digital converter and having an enable input for receiving a keying pulse in each line during a color burst;
   a comparator having a first input coupled to the output of said analog-to-digital converter, a second input and an output for indicating when said first input is greater than said second input;
   a first buffer memory having an input coupled to the output of said analog-to-digital converter, an output coupled to said comparator second input, and an enable input coupled to said comparator output;
   a subtracter having a minuend input coupled to said first buffer memory output, and a subtrahend input coupled to the output of said black level measuring stage, and an output;
   a first limiter having an input coupled to said subtracter output, and an output, said limiter limiting its output to a positive numerical value near zero;
   a first divider having a dividend input coupled to said first limiter output, a divisor input and an output;
   a second buffer memory having an input and an output;
   an adder/subtracter having a first input coupled to the output of said threshold stage, a second input coupled to said second buffer memory output, an output coupled to said second buffer memory input and add and subtract control inputs;
   a second divider having a dividend input coupled to said second buffer memory output, a divisor input coupled to said first divider output, and an output;
   a first adder having a first input coupled to said second divider output, a second input and an output;
   a second limiter coupled to said first adder output, and having an output, said second limiter limiting its output to a numerical value of a phase error required for a predetermined capture range of synchronization;
   a low pass filter coupled to said second limiter output and having an output comprising p lower order bits and m-p higher order bits;
   a second adder having a first input coupled to said p lower order bits of the output of said low pass filter, a second input, an overflow output and an output;
   a third buffer memory having an input coupled to said second adder output, an output coupled to said second adder second input and said first adder second input, and an enable input coupled to said presettable counter count output;
   a digitally settable delay circuit comprising $2^p$ stages, each stage providing an equal delay time said delay circuit providing a delay between input and output terminals which is adjustable in equal size steps, each step being equal to said equal delay time and to the period of said clock signals divided by $2^p$, said delay circuit input being coupled to said predetermined count output of said presettable counter, said delay circuit output providing said synchronized pulse train said delay circuit having control inputs for determining said delay, said control inputs being coupled to said third buffer memory output;
   a third adder having a first input coupled to said second adder overflow output, a second input coupled to said low pass filter m-p higher order bits, a third input receiving the integral part of a predetermined divisor value and
   an output coupled to said presettable counter preset input;
   circuit means having first inputs coupled to outputs of said presettable counter and second inputs coupled to said third adder output for deriving switching signals at a first output coupled to said adder/subtracter add control input and at a second output coupled to said adder/subtracter control input; and wherein
   said first divider divisor input receives the numerical value $2^p$.

2. A digital circuit for generating a pulse train and synchronizing said pulse train with horizontal synchronizing pulses contained in a demodulated composite color signal, comprising:
   a source of clock signals having a frequency at least one order of magnitude higher than the frequency of said pulse train;
   a presettable counter, having a preset input, a count input coupled to said source of clock signals, a predetermined count output, and a count output for a count occurring before said predetermined count output;
   an analog-to-digital converter clocked by said clock signals for converting said demodulated composite color signal to digital signals;
   a threshold stage coupled to the output of said analog-to-digital converter and having a threshold value equal to a predetermined black level;
   a memory containing a predetermined black level and having inputs coupled to the output of said analog-to-digital converter;
   a comparator having a first input coupled to the output of said analog-to-digital converter, a second input and an output for indicating when said first input is greater than said second input;
   a first buffer memory having an input coupled to the output of said analog-to-digital converter, an output coupled to said comparator second input, and an enable input coupled to said comparator output;
   a subtracter having a minuend input coupled to said first buffer memory output, and a subtrahend input coupled to the output of said memory, and an output;

a first limiter having an input coupled to said subtracter output, and an output, said limiter limiting its output to a positive numerical value near zero;

a first divider having a dividend input coupled to said first limiter output, a divisor input and an output;

a second buffer memory having an input and an output;

an adder/subtracter having a first input coupled to the output of said threshold stage, a second input coupled to said second buffer memory output, an output coupled to said second buffer memory input and add and subtract control inputs;

a second divider having a dividend input coupled to said second buffer memory output, a divisor input coupled to said first divider output, and an output;

a first adder having a first input coupled to said second divider output, a second input and an output;

a second limiter coupled to said first adder output, and having an output, said second limiter limiting its output to a numerical value of a phase error required for a predetermined capture range of synchronization;

a low pass filter coupled to said second limiter output and having an output comprising p lower order bits and m-p higher order bits;

a second adder having a first input coupled to said p lower order bits of the output of said low pass filter, a second input, an overflow output and an output;

a third buffer memory having an input coupled to said second adder output, an output coupled to said second adder second input and said first adder second input, and an enable input coupled to said presettable counter count output;

a digitally settable delay circuit comprising $2^p$ stages, each stage providing an equal delay time and said delay circuit providing a delay between input and output terminals which is adjustable in equal size steps, each step being equal to said equal delay time and to the period of said clock signals divided by $2^p$, said delay circuit input being coupled to said predetermined count output of said presettable counter, said delay circuit output providing said synchronized pulse train said delay circuit having control inputs for determining said delay, said control inputs being coupled to said third buffer memory output;

a third adder having a first input coupled to said second adder overflow output, a second input coupled to said low pass filter m-p higher order bits, a third input receiving the integral part of a predetermined divisor value and an output coupled to said presettable counter preset input;

circuit means having first inputs coupled to outputs of said presettable counter and second inputs coupled to said third adder output for deriving switching signals at a first output coupled to said adder/subtracter add control input and at a second output coupled to said adder/subtracter subtract control input; and wherein said first divider divisor input receives the numerical value $2^p$.

3. A digital circuit for generating a pulse train and synchronizing said pulse train with horizontal synchronizing pulses contained in a demodulated composite color signal, comprising:

a source of clock signals having a frequency at least one order of magnitude higher than the frequency of said pulse train;

a presettable counter, having a preset input, a count input coupled to said source of clock signals, a predetermined count output, and a count output for a count occurring before said predetermined count output;

an analog-to-digital converter clocked by said clock signals for converting said demodulated composite color signal to digital signals;

a black level measuring stage coupled to the output of said analog-to-digital converter and having an enable input for receiving a keying pulse in each line during a color burst;

a comparator having a first input coupled to the output of said analog-to-digital converter, a second input and an output for indicating when said first input is greater than said second input;

a first buffer memory having an input coupled to the output of said analog-to-digital converter, an output coupled to said comparator second input, and an enable input coupled to said comparator output;

a subtracter having a minuend input coupled to said first buffer memory output, and a subtrahend input coupled to the output of said black level measuring stage, and an output;

a subtracter/inverter stage having a first input coupled to the output of said analog-to-digital converter, a second input coupled to the output of said black level measuring stage, and an output, said subtracter/inverter stage forming an output signal in accordance with the relationship $v2=\frac{1}{2}(\sqrt{(sw'-v1)^2}+sw'-v1)$ where $v2$=the output signal, $v1$=digital composite color signal output of said analog-to-digital converter, and $sw'$=digital black level signal output of said black level measuring stage;

a first limiter having an input coupled to said subtracter output, and an output, said limiter limiting its output to a positive numerical value near zero;

a first divider having a dividend input coupled to said first limiter output, a divisor input and an output;

a second buffer memory having an input and an output;

an adder/subtracter having a first input coupled to the output of said subtracter/inverter stage, a second input coupled to said second buffer memory output, an output coupled to said second buffer memory input and add and subtract control inputs;

a second divider having a dividend input coupled to said second buffer memory output, a divisor input coupled to said first divider output, and an output;

a first adder having a first input coupled to said second divider output, a second input and an output;

a second limiter coupled to said first adder output, and having an output, said second limiter limiting its output to a numerical value of a phase error required for a predetermined capture range of synchronization;

a low pass filter coupled to said second limiter output and having an output comprising p lower order bits and m-p higher order bits;

a second adder having a first input coupled to said p lower order bits of the output of said low pass filter, a second input, an overflow output and an output;

a third buffer memory having an input coupled to said second adder output, an output coupled to said second adder second input and said first adder second input, and an enable input coupled to said presettable counter count output;

a digitally settable delay circuit comprising $2^p$ stages, each stage providing an equal delay time and said delay circuit providing a delay between input and output terminals which is adjustable in equal size steps, each step being equal to said equal delay time and to the period of said clock signals divided by $2^p$, said delay circuit input being coupled to said predetermined count output of said presettable counter, said delay dircuit output providing said synchronized pulse train said delay circuit having control inputs for determining said delay, said control inputs being coupled to said third buffer memory output;

a third adder having a first input coupled to said second adder overflow output, a second input coupled to said low pass filter m-p higher order bits, a third input receiving the integral part of a predetermined divisor value and an output coupled to said presettable counter preset input;

circuit means having first inputs coupled to outputs of said presettable counter and second inputs coupled to said third adder output for deriving switching signals at a first output coupled to said adder/subtracter add control input and at a second output coupled to said adder/subtracter subtract control input; and wherein said first divider divisor input receives the numerical value $2^p$.

4. A digital circuit for generating a pulse train and synchronizing said pulse train with horizontal synchronizing pulses contained in a demodulated composite color signal, comprising:

a source of clock signals having a frequency at least one order of magnitude higher than the frequency of said pulse train;

a presettable counter, having a preset input, a count input coupled to said source of clock signals, a predetermined count output, and a count output for a count occurring before said predetermined count output;

an analog-to-digital converter clocked by said clock signals for converting said demodulated composite color signal to digital signals;

a memory containing a predetermined black level and having inputs coupled to the output of said analog-to-digital converter;

a comparator having a first input coupled to the output of said analog-to-digital converter, a second input and an output for indicating when said first input is greater than said second input;

a first buffer memory having an input coupled to the output of said analog-to-digital converter, an output coupled to said comparator second input, and an enable input coupled to said comparator output;

a subtracter having a minuend input coupled to said first buffer memory output, and a subtrahend input coupled to the output of said memory and an output;

a subtracter/inverter stage having a first input coupled to the output of said analog-to-digital converter, a second input coupled to the output of said memory, and an output, said subtracter/inverter stage forming an output signal in accordance with the relationship $v2 = \frac{1}{2}(\sqrt{(sw'-v1)^2} + sw' - v1)$ where $v2$ = the output signal, $v1$ = digital composite color signal output of said analog-to-digital converter, and $sw'$ = digital black level signal output of said memory;

a first limiter having an input coupled to said subtracter output, and an output, said limiter limiting its output to a positive numerical value near zero;

a first divider having a dividend input coupled to said first limiter output, a divisor input and an output;

a second buffer memory having an input and an output;

an adder/subtracter having a first input coupled to the output of said subtracter/inverter stage, a second input coupled to said second buffer memory output, an output coupled to said second buffer memory input and add and subtract control inputs;

a second divider having a dividend input coupled to said second buffer memory output, a divisor input coupled to said first divider output, and an output;

a first adder having a first input coupled to said second divider output, a second input and an output;

a second limiter coupled to said first adder output, and having an output, said second limiter limiting its output to a numerical value of a phase error required for a predetermined capture range of synchronization;

a low pass filter coupled to said second limiter output and having an output comprising p lower order bits and m-p higher order bits;

a second adder having a first input coupled to said p lower order bits of the output of said low pass filter, a second input, an overflow output and an output;

a third buffer memory having an input coupled to said second adder output, an output coupled to said second adder second input and said first adder second input, and an enable input coupled to said presettable counter count output;

a digitally settable delay circuit comprising $2^p$ stages, each stage providing an equal delay time said delay circuit providing a delay between input and output terminals which is adjustable in equal size steps, each step being equal to said equal delay time and to the period of said clock signals divided by $2^p$, said delay circuit input being coupled to said predetermined count output of said presettable counter, said delay circuit output providing said synchronized pulse train said delay circuit having control inputs for determining said delay, said control inputs being coupled to said third buffer memory output;

a third adder having a first input coupled to said second adder overflow output, a second input coupled to said low pass filter m-p higher order bits, a third input receiving the integral part of a predetermined divisor value and an output coupled to said presettable counter preset input;

circuit means having first imputs coupled to outputs of said presettable counter and second inputs coupled to said third adder output for deriving switching signals at a first output coupled to said adder/subtracter add control input and at a second output coupled to said adder/subtracter subtract control input; and wherein said first divider divisor input receives the numerical value $2^p$.

5. A digital circuit in accordance with claim 1, comprising:
   a second comparator for comparing the output of said black level measuring stage with a predetermined black level, and providing an output when said black level measuring stage output is greater than said predetermined level;
   a two input logic gate having a first input coupled to said second comparator output and a second input receiving a pulse occurring during the back porch in each line;
   a first resistor coupled to a potential source;
   a second resistor serially connected to said first resistor, the junction between said first and second resistors being coupled to said analog-to-digital converter;
   an electronic switch having a control input coupled to the output of said logic gate, a first terminal coupled to ground and a second terminal coupled to said second resistor, said switch connecting said first and second terminals in dependence on said output of said logic gate; and
   a capacitor for coupling said modulated composite color signals to said analog-to-digital converter.

6. A digital circuit in accordance with claim 2, comprising:
   a second comparator for comparing the output of said memory with a predetermined black level, and providing an output when said memory output is greater than said predetermined level;
   a two input logic gate having a first input coupled to said second comparator output and a second input receiving a pulse occurring during the back porch in each line;
   a first resistor coupled to a potential source;
   a second resistor serially connected to said first resistor, the junction between said first and second resistors being coupled to said analog-to-digital converter;
   an electronic switch having a control input coupled to the output of said logic gate, a first terminal coupled to ground and a second terminal coupled to said second resistor, said switch connecting said first and second terminals in dependence on said output of said logic gate; and
   a capacitor for coupling said demodulated composite color signals to said analog-to-digital converter.

7. A digital circuit in accordance with claim 3, comprising:
   a second comparator for comparing the output of said black level measuring stage with a predetermined black level, and providing an output when said black level measuring stage output is greater than said predetermined level;
   a two input logic gate having a first input coupled to said second comparator output and a second input receiving a pulse occurring during the back porch in each line;
   a first resistor coupled to a potential source;
   a second resistor serially connected to said first resistor, the junction between said first and second resistors being coupled to said analog-to-digital converter;
   an electronic switch having a control input coupled to the output of said logic gate, a first terminal coupled to ground and a second terminal coupled to said second resistor, said switch connecting said first and second terminals in dependence on said output of said logic gate; and
   a capacitor for coupling said demodulated composite color signals to said analog-to-digital converter.

8. A digital circuit in accordance with claim 4, comprising:
   a second comparator for comparing the output of said memory with a predetermined black level, and providing an output when said memory output is greater than said predetermined level;
   a two input logic gate having a first input coupled to said second comparator output and a second input receiving a pulse occurring during the back porch in each line;
   a first resistor coupled to a potential source;
   a second resistor serially connected to said first resistor, the junction between said first and second resistors being coupled to said analog-to-digital converter;
   an electronic switch having a control input coupled to the output of said logic gate, a first terminal coupled to ground and a second terminal coupled to said second resistor, said switch connecting said first and second terminals in dependence on said output of said logic gate; and
   a capacitor for coupling said demodulated composite color signals to said analog-to-digital converter.

9. A digital circuit in accordance with claim 1, comprising:
   logic means for controlling signals applied to said adder/subtracter first input in response to a noise suppression pulse occurring during said synchronizing pulses and overlapping said synchronizing pulses by approximately $\pm 1$ microsecond.

10. A digital circuit in accordance with claim 2, comprising:
    logic means for controlling signals applied to said adder/subtracter first input in response to a noise suppression pulse occurring during said synchronizing pulses and overlapping said synchronizing pulses by approximately $\pm 1$ microsecond.

11. A digital circuit in accordance with claim 3, comprising:
    logic means for controlling signals applied to said adder/subtracter first input in response to a noise suppression pulse occurring during said synchronizing pulses and overlapping said synchronizing pulses by approximately $\pm 1$ microsecond.

12. A digital circuit in accordance with claim 4, comprising:
    logic means for controlling signals applied to said adder/subtracter first input in response to a noise suppression pulse occurring during said synchronizing pulses and overlapping said synchronizing pulses by approximately $\pm 1$ microsecond.

13. A digital circuit in accordance with claim 5, comprising:
    logic means for controlling signals applied to said adder/subtracter first input in response to a noise suppression pulse occurring during said synchronizing pulses and overlapping said synchronizing pulses by approximately $\pm 1$ microsecond.

14. A digital circuit in accordance with claim 6, comprising:

logic means for controlling signals applied to said adder/subtracter first input in response to a noise suppression pulse occurring during said synchronizing pulses and overlapping said synchronizing pulses by approximately ±1 microsecond.

15. A digital circuit in accordance with claim 7, comprising:
logic means for controlling signals applied to said adder/subtracter first input in response to a noise suppression pulse occurring during said synchronizing pulses and overlapping said synchronizing pulses by approximately ±1 microsecond.

16. A digital circuit in accordance with claim 8, comprising:
logic means for controlling signals applied to said adder/subtracter first input in response to a noise suppression pulse occurring during said synchronizing pulses and overlapping said synchronizing pulses by approximately ±1 microsecond.

* * * * *